(12) United States Patent
Ezran et al.

(10) Patent No.: US 11,084,571 B2
(45) Date of Patent: Aug. 10, 2021

(54) MOTION CONTROL SYSTEM FOR FOOT-ACTUATED FLIGHT CONTROLLER

(71) Applicant: Configurable Controls, LLC, Los Angeles, CA (US)

(72) Inventors: Shemuel M. Ezran, Los Angeles, CA (US); James Casey Hanlon, Apache Junction, AZ (US)

(73) Assignee: Configurable Controls, LLC, Los Angeles, CA (US)

( * ) Notice: Subject to any disclaimer, the term of this patent is extended or adjusted under 35 U.S.C. 154(b) by 11 days.

(21) Appl. No.: 16/487,816

(22) PCT Filed: Feb. 21, 2018

(86) PCT No.: PCT/US2018/019005
§ 371 (c)(1),
(2) Date: Aug. 21, 2019

(87) PCT Pub. No.: WO2018/156618
PCT Pub. Date: Aug. 30, 2018

(65) Prior Publication Data
US 2020/0055588 A1    Feb. 20, 2020

Related U.S. Application Data

(60) Provisional application No. 62/461,742, filed on Feb. 21, 2017.

(51) Int. Cl.
*B64C 13/46*    (2006.01)
*B64C 13/50*    (2006.01)

(52) U.S. Cl.
CPC ............ *B64C 13/46* (2013.01); *B64C 13/503* (2013.01)

(58) Field of Classification Search
CPC ........ B64C 13/46; B64C 13/503; B64C 13/08; B64C 13/345; B64C 13/507
See application file for complete search history.

(56) References Cited

U.S. PATENT DOCUMENTS

| | | | |
|---|---|---|---|
| 4,236,685 A | | 12/1980 | Kissel |
| 5,493,497 A | * | 2/1996 | Buus ................... G05D 1/0077 701/4 |

(Continued)

FOREIGN PATENT DOCUMENTS

| | | |
|---|---|---|
| EP | 0573106 A1 | 12/1993 |
| EP | 2626301 A2 | 8/2013 |
| EP | 3069990 A1 | 9/2016 |

OTHER PUBLICATIONS

Title: "Aging Aircraft Evaluation of the Airbus A320 Rudder Control System"; U.S. Department of Transportation; Published Mar. 2008; URL: http://www.tc.faa.gov/its/worldpac/techrpt/ar0765.pdf.

*Primary Examiner* — Rodney A Bonnette
(74) *Attorney, Agent, or Firm* — Jeffrey A. Finn

(57) ABSTRACT

The present invention discloses improvements to mechanical and electro-mechanical force simulators for aircraft pilot controllers, and particularly foot-actuated controllers. In particular, the invention replaces conventional foot-actuated, pilot controller systems—namely, those that employ multiple, discrete, motion control subsystems to control the various force simulation and trim functions used in modern aircraft to assist pilot control of a given axis of flight—with a single motion control system. The invention accomplishes this in part by eliminating the force-feel spring used in conventional, federated, foot-actuated, motor-coupled pilot controllers. Instead, in a preferred embodiment, the motion control system employs a single actuator (14), such as a BLDC motor/gearhead assembly, driven by control electron- (Continued)

ics that receives inputs from force sensors (13) and position sensors (9, 10) mounted on the actuator to, at once, provide both the "feel forces" (FEEL, FRICTION, and DAMPING) and controls trim to the pilot's foot pedals.

21 Claims, 6 Drawing Sheets

(56) References Cited

U.S. PATENT DOCUMENTS

| | | | |
|---|---|---|---|
| 2013/0206898 A1* | 8/2013 | Yates | B64C 27/56 244/17.11 |
| 2016/0304190 A1* | 10/2016 | Grohmann | B64C 27/605 |

* cited by examiner

The A320 Family Rudder Control System and Critical Components

*PRIOR ART*

PRIOR ART

MOTION CONTROL SYSTEM FOR FOOT-ACTUATED FLIGHT CONTROLLER

RELATED APPLICATIONS

This application is a U.S. National Stage of International Application No. PCT/US18/19005, filed on Feb. 21, 2018, which claims the benefit of U.S. Provisional Application No. 62/461,742 filed Feb. 21, 2017, the contents of each of which are incorporated by this reference in their entireties for all purposes as if fully set forth herein.

TECHNICAL FIELD

The present invention relates generally to pilot flight controller systems and methods and, more specifically, to force simulators and controls trim functionality for foot-actuated controllers.

BACKGROUND

Since the dawn of aviation, pilots have used flight controllers to control the three axes of rotation of fixed-wing aircraft-roll, pitch and yaw. Conventionally, the pilot used a hand control stick, or yoke, to manually, i.e. mechanically, move the aileron and elevator flight control structures, or surfaces, on an aircraft's wings that govern the aircraft's roll and pitch, respectively, and rudder foot pedals to control yaw (movement about the axis perpendicular to the wings). Controls trim was used to counteract hydro- or aerodynamic forces on the aircraft in order to stabilize it in a desired attitude without the need for the operator to constantly apply an adjusting control force. Controlling trim fundamentally differs from controlling the underlying control surfaces in that trim is often adjusted for long periods of time such that the zero point of a feel curve must be moved to the trimmed position—i.e. creating a new "zero."

Before the development of power-assisted control systems for aircraft, that is, with purely mechanical flight control systems, a pilot could gauge the amount of control (and forces) the pilot was applying to each of the three primary aerodynamic control surfaces via "tactile feedback"—that is, by directly sensing the amount of force required to maintain a particular deflection of each control surface. With the advent of power-assisted flight control systems, however, the load on the surfaces could no longer be directly felt by the pilot, thus creating a risk of overstressing the aircraft through excessive control surface movement. To overcome this problem, artificial feel systems were developed.

In modern aircraft, the artificial forces sensed by the pilot's hand and/or feet in flight are actually a combination of three primary forces generated by the control system: (1) a displacement force, called hereinafter a "FEEL force" or "FEEL" (all caps); (2) a Coulomb friction force, called hereinafter a "FRICTION force" or "FRICTION" (all caps); and (3) a viscous friction-force, called hereinafter "DAMPING force" or "DAMPING" (all caps). Another force that is commonly sensed by pilots in conventional aircraft is referred to as "mechanical inertia" force. This sensation is largely an artifact of the masses inherent in legacy controller solutions and the inertia associated with these masses as they are accelerated and decelerated during pilot commands. These feedback forces are commonly referred to collectively as the "feel forces" that are generated by what is often called the "artificial feel system." These feel forces are constantly felt by the pilot's hand or feet as he or she manipulates the control stick or pedals.

The simplest artificial feel systems would consist of spring-loaded mountings for the control stick and pedals, such that when the stick or pedals were moved from a preselected neutral position, a restoring, or centering, force was developed in a direction tending to return the stick or pedal to the neutral position. Such systems were not satisfactory, however, for situations where the stick or pedals had to be maintained for long periods of time at a position other than the predetermined neutral position. In these situations, it became necessary for the pilot to exert a force on the stick or pedals to overcome the restoring spring force for an extended period of time simply to maintain a chosen control setting. Because of this problem, it was desirable to create new neutral positions for the control stick or pedals themselves to a position to be used for an extended period of time. The process of resetting the neutral position—or creating a "new zero"—is known as "trimming" the feel system. Numerous mechanical solutions, such as brakes and federated actuators, were employed to accomplish this.

As fixed-wing aircraft controls have migrated to full "Fly-by-Wire" (FBW) designs, becoming even more automated and complex, artificial feel and trim systems have had to keep up, Conventionally, for any given axis of flight, multiple discrete mechanisms have been employed to simulate the FEEL, FRICTION and DAMPING functions and to control trim. Numerous mechanical (e.g., springs, friction brakes, and viscous dampers), electro-mechanical (e.g, motors) and hydraulic actuator mechanisms have long been used to meet these needs, often in various combinations for any given axis of flight control. Unfortunately, this complexity has translated to inefficiencies—the need for more components, and its concomitant drawbacks of additional weight, costs, maintenance, and/or reliability impacts. An additional artifact of these systems is that they have generally been designed to maintain the feel of the old legacy mechanical systems so as to minimize the training requirements for pilots when they fly the new aircraft. The impact of this has been that many systems currently in use are not configurable, i.e. they replicate a specific "feel" that cannot be modified or adjusted.

The industry has attempted to address this complexity problem in numerous ways. Indeed, in the context of full fly-by-wire aircraft, FEEL, FRICTION, DAMPING, and TRIM hardware are continually being designed into smaller packages. One direction has been to multi-task a single electric motor such that it controls multiple feel simulation functions (such as friction and damping). Others even disclose controlling one or more of the feel simulations and trim control with a single motor. However, all such systems and disclosures are limited to hand controllers, either of the single axis (as in the case of helicopters) dual axis, or even triple axis variety.

Foot-actuated controller design, on the other hand, has not advanced with motor-based solutions as have hand controller designs. With on-aircraft foot controllers, a supplementary mechanical feel spring is often included. Or, the sum of all functionality concentrated in these motor-based designs omits one or more of the key elements of feel simulation and trim. One reason for this may in part be because the higher forces typically required to control foot actuated controllers, as compared to hand actuated controllers, better lend themselves to keeping with the reliable, repeatable, high-force capacity mechanical spring technology. For example, in prior art systems where simulated feedback for the yaw axis is discussed (conventionally, the domain of foot pedal controllers), supplementary devices are included to lessen the load carried by the actuator, or supplementary devices are intended to be the primary load bearing element for FEEL (resistive spring force) while a motor is used to adjust FEEL parameters. A consequence of this approach is the necessity of including two or more federated devices to adequately address the three primary forces on the controller as well as controls trim.

On the other hand, the size (i.e. horsepower) of motors or gear-motors required to handle the high on-aircraft forces that are unique to foot controllers would appear to make a motor-only based solution for rudder control too heavy for on-aircraft applications (absent the inclusion of a physical centering spring to supplement motor forces).

An example of a classically architected system is the federated pedal-actuated rudder control system of the Airbus A320. This system is described and shown in various public documents, including the FAA's 2008 paper titled, "Aging Aircraft Evaluation of the Airbus A320 Rudder Control System", found at http://www.tc.faa.gov/its/worldpac/techrpt/ar0765.pdf (the "A320 Rudder Control System paper"). The figure on page 3 of the paper, showing a partial exploded view of the A320 rudder control system and system, is reproduced here as prior art FIG. 4, and some of its components are further detailed in FIGS. 5 and 6. Referring to these figures, the A320's federated pedal-controlled rudder system uses a combination of mechanisms to achieve artificial feel and trim. These include (1) a "Trim Actuator" (contained in Part No. D272-70400) to control trim, (2) a cable system (the "Cable Tensioning Regulator" shown in the figure as part numbers FEL7L-000 and FEL9L-000 as well as associated cables, brackets, and cable-crank mechanism located towards the tail of the depicted aircraft) to provide FRICTION and DAMPING and (3) an artificial spring force for FEEL, supplied by a federated feel spring and solenoid device (Part Nos. 450EPOLY). The FEEL spring and trim actuator are grouped on the A320 into a higher-level assembly titled: "Artificial Feel and Trim Unit" linear actuator. As mentioned above, here, a subset of the three (3) simulated forces (the feel system) and trim are grouped in a single mechanism.

As each rudder pedal in a pedal pair (see both FIGS. 4 and 5) is depressed, a pedal position sensor and transmitter unit (FIG. 6) coupled to the pedal senses pedal movement, translating the pedal depression to an electronic signal indicative of the position of the pedal, which in turn is fed back into the Fly-By-Wire computers on the aircraft. The complexity of such a system is readily apparent.

In sum, none of the prior art teaches or suggests the possibility of controlling all of the "feel" functions, or even two of the three primary functions, for a foot controller with a single actuator-controlled mechanism and using the same force-feel actuator (e.g., motor or gear-motor) controlling all the "feel" functions to also affect the important function of controls trim. It would thus be desirable to have a feel and trim design for foot controllers that is substantially more efficient, compact and much less complex than found in existing systems.

SUMMARY

The present invention addresses the need for a simplified and more efficient yaw axis controller—or any control surface that may be controlled by foot pedals—by providing a programmable feel and trim system that provides all the conventional control system attributes previously addressed in one compact single actuator/controller design. The single actuator, preferably a motor or a motor with appropriate gear reduction, with programmable control electronics that controls the actuator, collectively the "motion control system" of the present invention, is capable of providing all required tactile feedback to a pilot's foot pedal-operated controller, as well as controls trim for a given axis. In particular, the single motion control system of the present invention couples to the foot pedals of a foot controller to provide for a single axis of control all of the following primary feel system functions: (A) FEEL—in place of a spring, or spring-like mechanical unit, to simulate the forces of a centering spring; (B) FRICTION—in place of a mechanical friction unit, to simulate the forces of Coulomb friction; (C) DAMPING—in place of a mechanical unit, to simulate the forces of viscous friction; and (D) CONTROLS TRIM function for controlling trim. Importantly, the single motor/controller system accomplishes all of the above without the use of any federated mechanical feel device.

In accordance with one aspect of the invention there is provided a single servo-motor yaw axis control system which includes mechanically-coupled first and second control devices, i.e., rudder pedals, which are each capable of generating control signals in response to manual input, for example, from movement of the rudder pedals caused by a pilot or a co-pilot OR by manual action through a trim switch that causes the coupled servo to move the pedals' position to a new offset null position.

Thus, the rudder pedals use the same actuator that applies the feel forces to the pedals in response to pilot position inputs for accomplishing the trim function. In a conventional architecture, a separate actuator is used to affect a trimmed position of the rudder pedals. When trimmed, the pedals are held in a deflected position by this separate actuator without the pilot being required to maintain a force to hold them in this position. In the present invention, however, this deflected pedal position is accomplished by sending the actuator controller an offset command. This causes the motor controls to move and maintain the pedals to an offset or deflected position. The controller uses this offset position as the new null/zero position for calculating and implementing the force vs position relationship for any position inputs the pilot inputs. This approach greatly simplifies the number of components and weight of the controller system and is made possible because the invention does not rely upon federated mechanical feel mechanisrris. Consequently, the force feel motor isn't required to hold the trimmed position against a spring force or other federated feel force generating device. It only has to move the pedals to the commanded trim position and implement the feel forces from that location.

Addressing the motor size issue discussed above, the present invention preferably adds a strategically-placed, disconnect mechanism, such as a shearing mechanism, an electromechanical clutch or mechanical torque limiter, between the pedal mechanism and the force-generating actuator. The conventional placement of a shearing mechanism is between the pilot and copilot stations in a conventional, mechanically coupled solution. The addition of a mechanism for accomplishing the disconnect function, such as a shearing mechanism (shown in FIGS. 1, 2 and 3), a mechanical ball detent torque limiter, a solenoid driven clutch or any other similar mechanism known to those skilled in the art, between the actuator and the remainder of the pilot controller allows for reduced motor and gearbox sizing that still meets all requirements for limit and ultimate loads, which, as discussed above, are uniquely high with foot controllers.

Moreover, the employ of a relatively small motor, and particularly if a direct-drive implementation where no reduction mechanism is used (see FIG. 3 and accompanying text below), may lead to loss of mechanical inertia sensations experienced by pilots in a conventional pilot control solution. An additional feel force to mimic the mechanical inertia of a conventional solution may therefore be implemented in the actuator controller and overlaid on the primary feel forces simulated by the actuator.

Multiple position sensors are preferably included to assure redundancy and integrity of reported pedal position. These sensors transmit position information to the Fly-by-Wire (FBW) computers for processing and expression in the aircraft's control surfaces. To assure an acceptably "smooth" "force versus displacement" experience (all three forces) over the entire range of pedal motion, and as a potential backup sensing device to the primary position sensors, one or more torque or force sensors are also preferably included to infer or detect force exerted on either rudder pedal set. In addition to reporting pedal position to the FBW computer, these same position sensor values (or values from independent position sensors) are used to determine the amount of simulated spring force the pedal-coupled actuator should generate, as spring force is proportional to pedal displacement. These position sensors are also strategically located to act as the position sensors for controlling trim, Thus, by concentrating trim and feel function in a single force-generating actuator, these sensors can provide trim position feedback and pedal position feedback simultaneously. Sensors such as position sensors, and/or force sensors, and/or rate sensors provide inputs to control software that determine the appropriate friction force the pedal-coupled actuator should generate to simulate the presence of conventional mechanical friction. Finally, either a measured (from, e.g., a tachometer) or derived rate value can be used to determine the appropriate damping force the pedal-coupled actuator should generate to simulate the presence of conventional mechanical damping.

Control electronics, such as Actuator Control Electronics (ACE's), are used to perform the function of translating the signals generated by each controller's complement of sensors into appropriate commands for the pedal-coupled actuator. The forces imparted by the pedal-coupled actuator can be modified by the ACEs to affect aircraft-specific break-out forces, aircraft state-dependent soft stops, or aircraft state-dependent variations in the feel curves intended to replace conventional mechanical components.

Preferred embodiments of a motion control system for a foot-actuated flight controller that controls a control surface of an aircraft may comprise an actuator and control electronics. The actuator may be coupled to a foot pedal of the controller for generating simulated feel forces on the foot pedal. The control electronics may be configured to be in communication with the actuator for generating command signals to cause the actuator to (a) generate at least two feel forces on the foot pedal at least in part in response to user inputs sensed on the foot pedal, and (b) control a trim function for the controller. The control electronics may be configured to generate command signals to cause the actuator to generate at least three feel forces on the foot pedal. One of the simulated feel forces generated by the actuator may be a mechanical inertia force. The system may include a set of position sensors for simultaneously sensing both pedal position and trim position of the foot-actuated flight controller. The system may include one set of sensors for providing pedal position feedback to the actuator and one set of sensors for providing the foot-actuated flight controller position to an aircraft flight control system.

In particular embodiments of the system, the sensed user inputs may include foot pedal position, torque, force, current, rotational speed, or any combination thereof. In certain embodiments of the system, the control surface is the yaw axis and the actuator is coupled to mechanically-coupled first and second rudder pedal pairs.

The control electronics may be configured to be responsive to an automatically-generated input signal to control the trim function. Alternatively, or in addition, the control electronics may be responsive to a manual, user-generated input signal to control the trim function. The control electronics may be an ACE. The control electronics may be programmable.

Depending upon the particular embodiment of the system, the actuator may be electro-mechanical. The actuator may comprise a motor, or the actuator may comprise a motor and gearhead assembly. The motor may be a brushless DC motor.

Particular preferred embodiments of the system may include a disconnect mechanism coupled between the actuator and the foot pedal. The disconnect mechanism may be a shearing mechanism such as, for example, a mechanical torque limiter, or may be an electromechanical clutch.

A method for controlling a foot-actuated flight controller for a control surface of an aircraft is also disclosed herein. Such method may comprise (a) providing a single actuator coupled to a foot pedal of the flight controller, and (b) controlling the actuator to generate feel forces and trim to the foot pedal.

A method for trimming the feel system of a flight controller is also disclosed herein. Such method may comprise (a) sensing all feel forces generated by a single actuator that is controlled with control electronics, (b) determining a zero point of force using the sensed feel forces without the need to counteract forces of any federated feel force creating mechanisms, (c) setting the zero point of force in space.

It is to be understood that the invention is not limited in its application to the details of construction and the arrangement of components described hereinafter and illustrated in the drawings and photographs. Those skilled in the art will recognize that various modifications can be made without departing from the scope of the invention.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
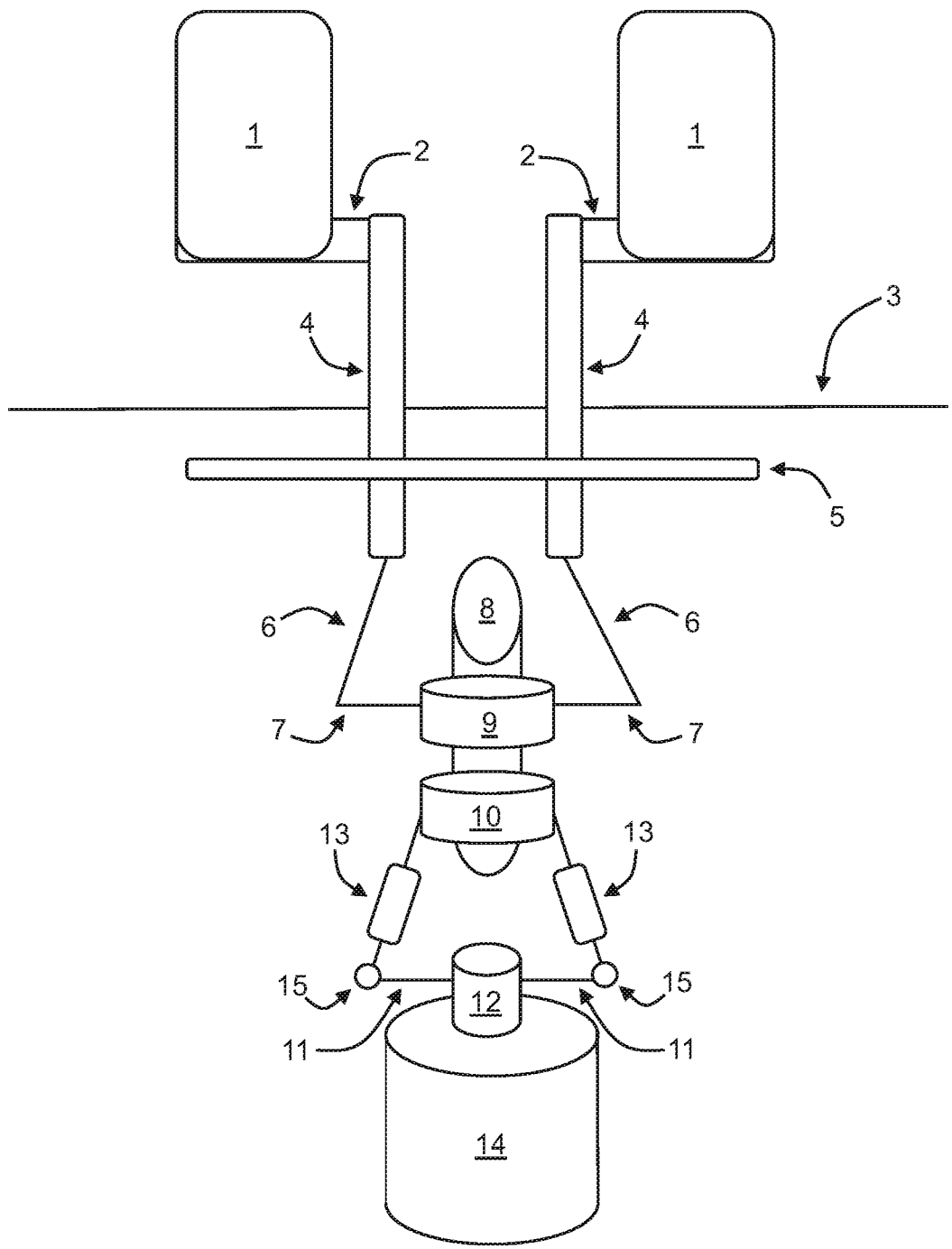
FIG. 1 is a diagrammatic plan view of a rudder pedal controller in accordance with one non-limiting, preferred embodiment of the present invention.

Referring now to the drawings, like reference numerals designate identical or corresponding features throughout the several views.

The drawings show a number of features of the present invention. FIG. 1 discloses one arrangement for connecting, or coupling, a force-generating actuator, such as a motor and gearhead assembly 14 to a foot pedal or pedal set of pilot or copilot's yaw-axis controller according to the present invention. In FIG. 1, as in FIG. 2, a pedal set 1 is shown coupled through a primary shaft to a force generating actuator, this coupling being a conventional arrangement well known to those of ordinary skill in the art. Alternately, FIG. 3 shows a pedal set directly coupled to a force-generating actuator.

More particularly, in FIG. 1, pedals 1 pivot on shafts 2 used to allow pedal rotation for brake inputs. These pivots are connected to pedal arms 4 whose translation through space as a result of a pilot's imparting of force is the mechanism through which pilots command an aircraft's yaw motion. These arms extend some distance above the flight deck floor 3 to a common pivot axis 5 for both arms. These arms connect below the common pivot to shafts 6 which link through cranks 7 to a primary shaft 8. The arrangement of these design elements will be such that force applied to one pedal will translate into a rotating motion imparted to the primary shaft 8. The rotation of the primary shaft will in turn impart motion through the opposing cranks and rods (not shown) to the opposite pedal arm and pedal, thus assuring opposite but symmetric motion of the arm and pedal to which force was not applied. Mounted on this primary shaft are one or more primary position sensors 9, 10. These sensors translate pedal motion into electrical signals that can be interpreted by the FBW computers into appropriate motion of aircraft control surfaces.

The primary shaft is linked to the force-generating actuator 14 by means of two rods and two force sensors 13 and two cranks 11, one for each rod-force sensor connection. A disconnect mechanism is preferably placed at the elbow of each crank 15 to allow the disconnect of a force-generating actuator in case of an actuator j am. Placement of a disconnect mechanism at this location will allow for the actuator to disconnect in case of jam before the pilot can input limit or ultimate loads. The cranks are attached to the actuator output shaft 12 which transmits the forces generated by the force-generating actuator 14. The actuator is controlled by a high integrity controller (not shown) to generate FEEL, FRICTION, and DAMPING characteristics just as those that would be created in a conventional architecture with federated mechanical FEEL, FRICTION and DAMPING devices. The controller can additionally be used to improve the feel system over the conventional designs by eliminating the negative attributes/artifacts introduced by traditional federated flight control systems, as will be understood by those in the art.

The forces generated by the force generating actuator 14 are determined by the pedal displacement sensed by the position sensors 9, 10, force sensors 13, and/or by simulated sensors created through the processing of other sensors' output: force, torque, motor position, motor current, or any other sensing means generally used by those skilled in the art to determine pedal position. These forces are transmitted back to the pilot pedals through the various cranks, rods, and sensors described above. Similarly, FRICTION and DAMPING forces are transmitted by the force-generating actuator through the cranks, rods, and sensors as in the case for FEEL force.

Concentrating the functions of all force-generating mechanisms simulating the overall feel of existing systems into a single actuator architecture simplifies the implementation of controls trim as only a single device requires adjustment to provide trim. Further, given the inventive implementation shown in FIG. 1, trim can be implemented electronically by resetting the point of neutral feel force, breakout, etc, as the force-generating actuator moves the pedals to their trimmed position. The FEEL, FRICTION, and DAMPING curves are thus adjusted electronically, avoiding the need for complex mechanical mechanisms, and consequent reliability impacts, within the yaw control unit to move the pedals and simultaneously adjust feel, friction, and damping characteristics that would otherwise be implemented through federated mechanical devices and their myriad means of primary and/or secondary attachment required of a certifiable design.

Figure 2:
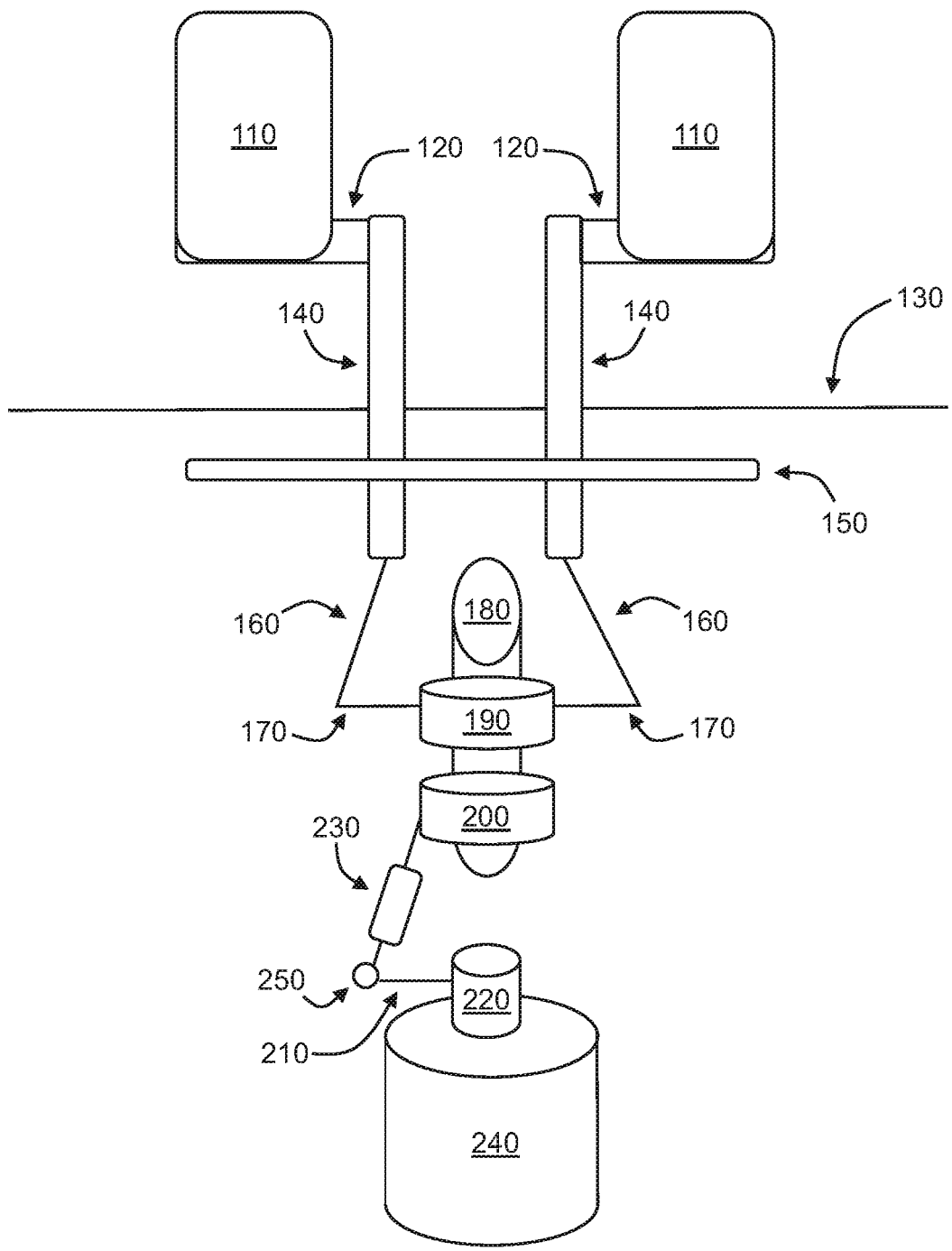
FIG. 2 is a diagrammatic plan view of a rudder pedal controller in accordance with another preferred embodiment of the present invention.
Figure 3:
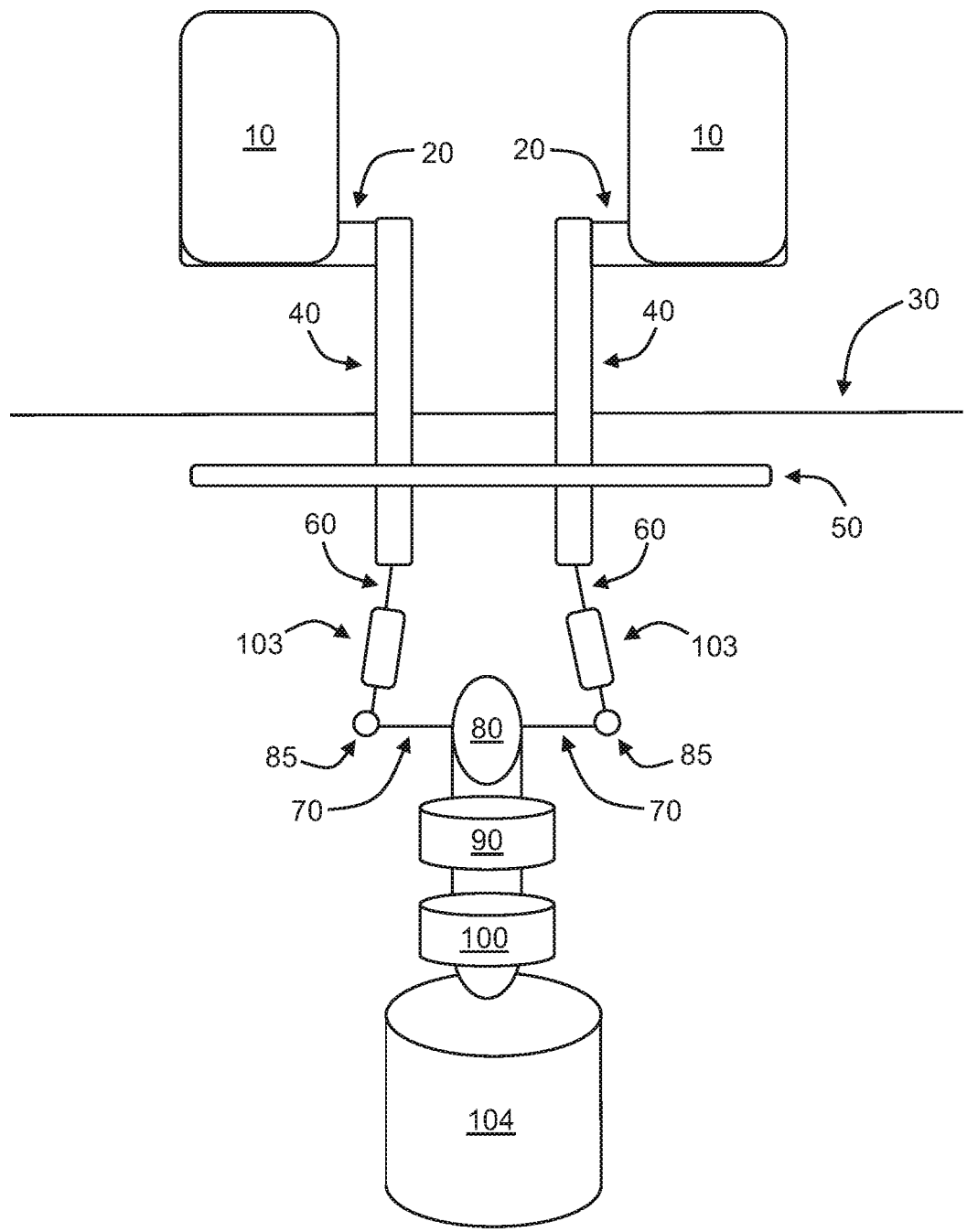
FIG. 3 is a diagrammatic plan view of a rudder pedal controller in accordance with yet another embodiment of the present invention.
Figure 4:
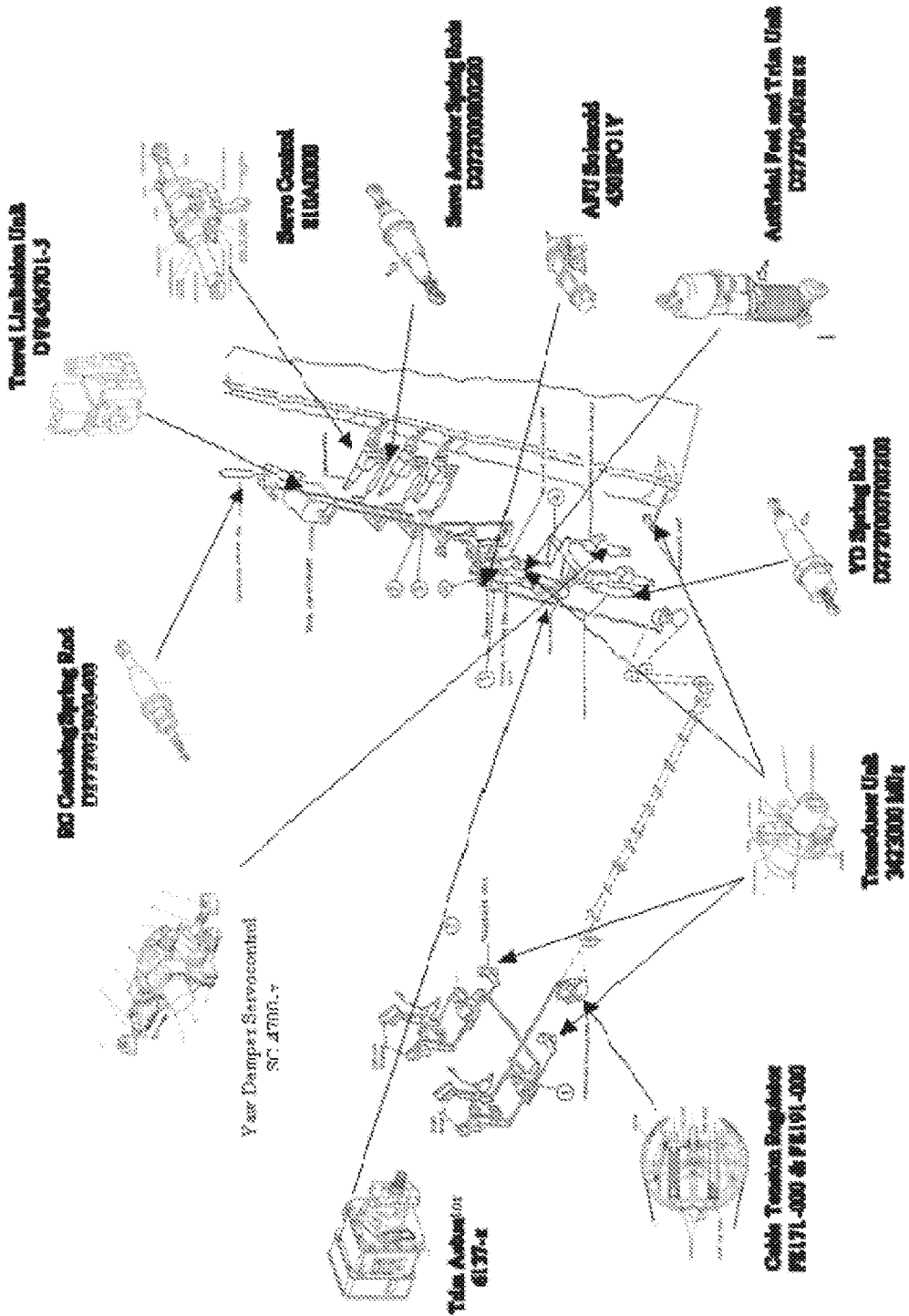
FIG. 4 is a diagrammatic view of an exemplary prior art rudder pedal control system.
Figure 5:
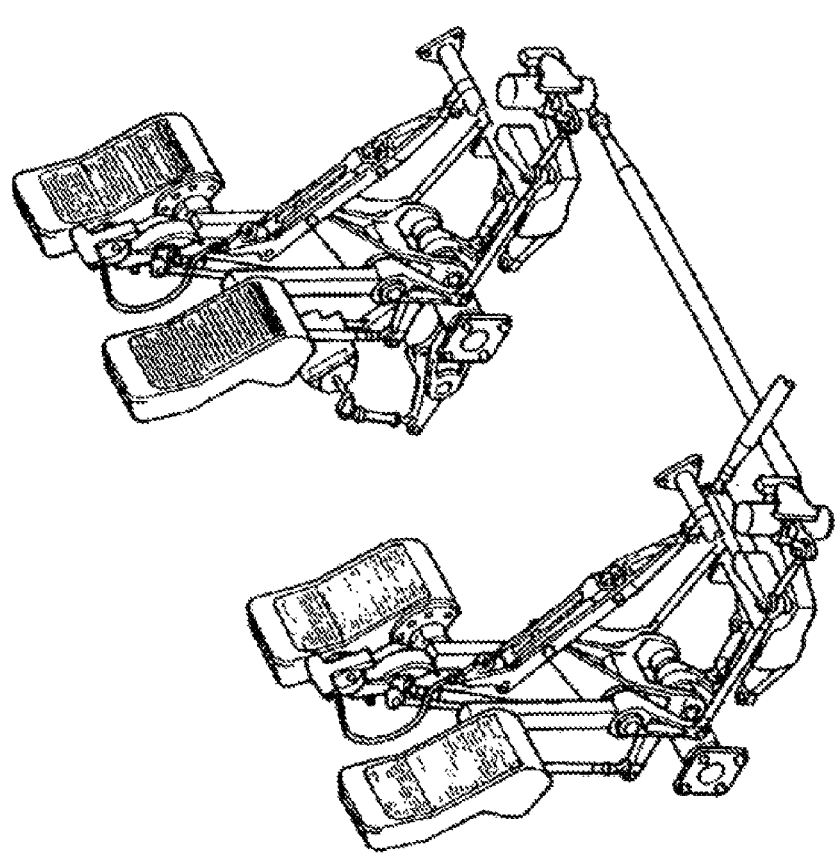
FIG. 5 is a diagrammatic view of one set of components of the prior art control system shown in FIG. 4.
Figure 5:
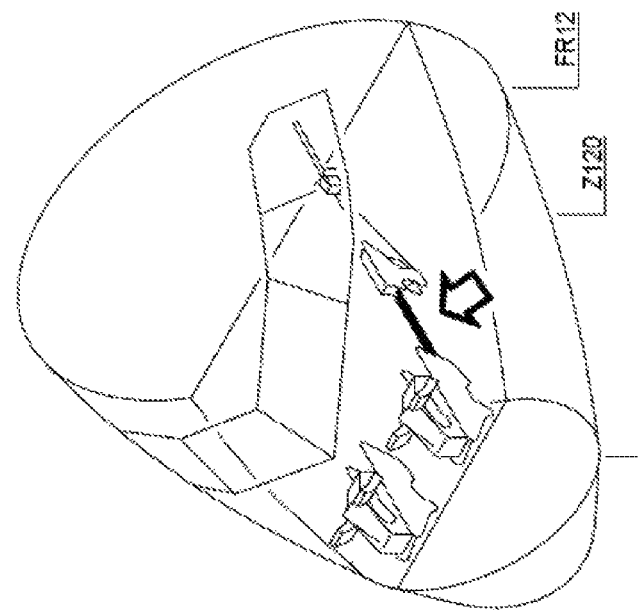
Figure 6:
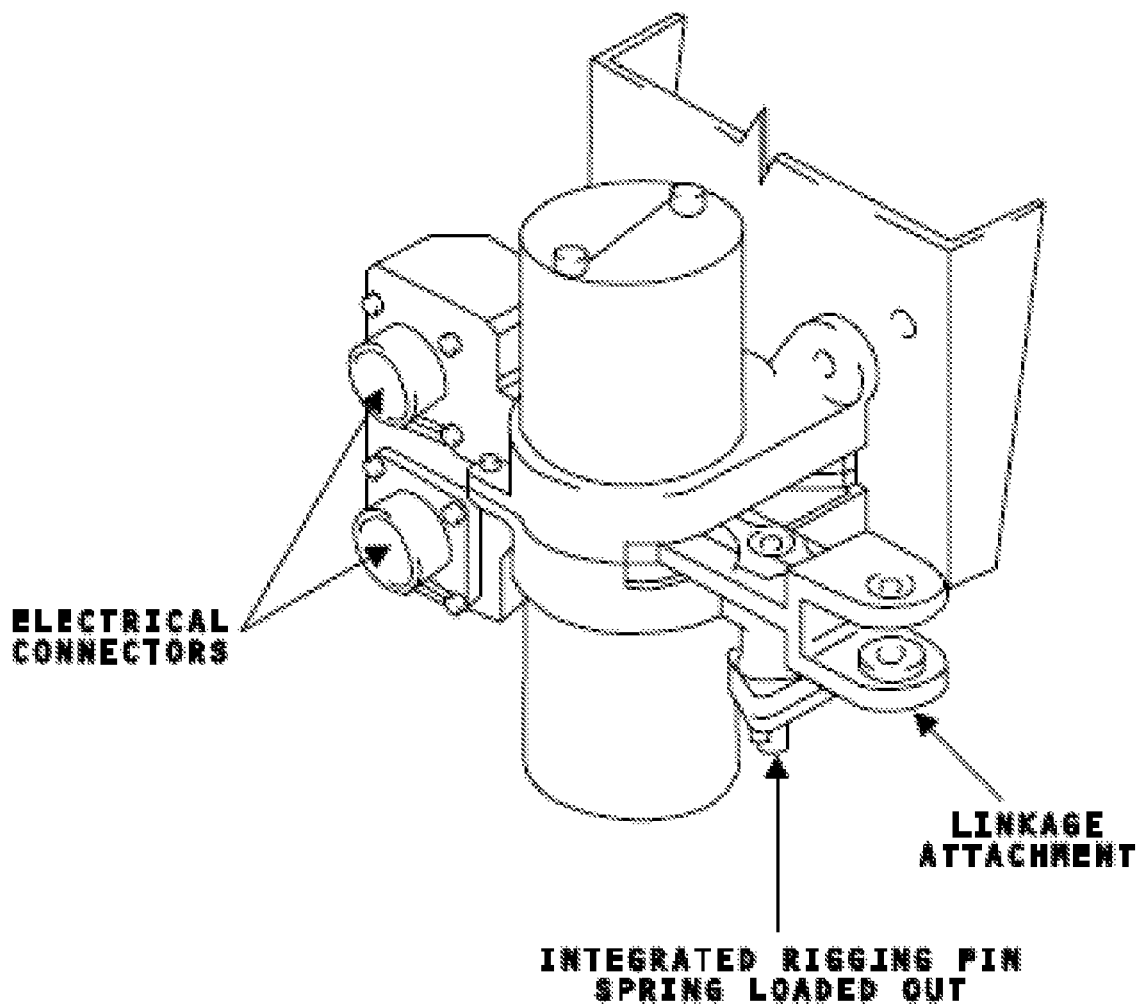
FIG. 6 is a diagrammatic view of another set of components of the prior art control system shown in FIG. 4.

An alternate implementation of the invention shown in FIG. 1 is disclosed in FIG. 2 where, in place of a double connection through cranks, force sensors, and rods, a single connection between the force-generating actuator 240 and primary shaft 180 is implemented. In this instantiation, all functionality of a yaw controller described in FIG. 1 is preserved. A single rod and force sensing assembly 230 connects the primary shaft to the actuator output 220. This rod-force sensor assembly and its associated crank 210 are implemented in such a fashion so as to enable a single mechanical connection from the primary shaft and the actuator output 220 that meets all functional availability and reliability requirements.

Turning to FIG. 3, shown here is yet another alternate implementation of the inventions shown in FIG. 1 and FIG. 2, where the primary shaft shown in FIG. 1 or FIG. 2 8, 180 is obviated by a lengthened actuator output shaft 80. The rods and cranks required by such a standalone primary shaft 6, 7, 160, 170 are similarly obviated by virtue of direct connections from the pedal arms through appropriate rods 60 cranks 70 and force sensors 103. In this instantiation, forces generated by the force-generating actuator directly affect the feel of pedals as a pilot presses on them in an attempt to induce rotation of the actuator output shaft 80 through translation of the pedal arms 40. Dual force sensors 103 are included in this implementation to assure the forces a pilot may impart to one or the other pedal in a station's set is fully sensed.

Turning now to the trim function, when, for a given control surface, trim is implemented along with FEEL, FRICTION, and DAMPING force-generating mechanisms, conventionally, standalone mechanisms are required to ensure the trim position remains fixed in its intended position and not pushed into a 'back-driven' or 'forward-driven' position. These mechanisms may include additional position sensors to detect un-commanded motion by a dedicated trim actuator. In contrast, the present invention accomplishes trim position hold by leveraging the signals generated from the complement of position sensors 9, 10, 190, 200, 90, 100 and force sensors 13, 230, 103 used to implement FEEL, FRICTION, and DAMPING. In the absence of pilot or copilot input force(s) as sensed by the force sensors, the pedals return to their trimmed positions and remain fixed there through closed-loop servo control around the position sensors, as would be implemented by those knowledgeable in the art. In this way, a single set of position sensors, operating in tandem with force or torque sensors, communicating in closed loop feedback with the actuator-coupled motion control system, enables all FEEL, FRICTION, and DAMPING force simulation as well as Trim Control.

More specifically, one potential approach is to introduce a trim bias to the position sensor curves, such that control loops for FEEL, FRICTION, and DAMPING forces will work to maintain a zeroing of this bias value in sensed position. This is in contrast to conventional architectures where a second, potentially lower bandwidth, set of redundant position sensors are required to provide high integrity control of a federated trim actuator. A programmable, ACE control will generate command signals to cause the actuator to go to a null offset position. This new position can then be used as the new null position to which, when input force is removed, the controller will automatically return. It should be understood that other electronic control mechanisms and designs that prevent trim runaway that are known to those in the art may be implemented in the present invention.

It should also be understood that the force and position generating actuator of the present invention can be any programmable actuator capable of driving and holding the forces needed to simulate the feel functions and provide the trim functionality required for a foot controller that controls any of the axes of flight. One preferred actuator consists of a brushless DC (BLDC) servo motor, optionally coupled to a gearbox that, with an appropriate programmable BLDC controller, is capable of providing the variable torque, speed and holding forces required by the present invention. However, other electronically controlled actuators, may be employed that accomplish the functions of the present invention.

Force generating mechanisms, sensors, control electronics, and control SW may be implemented in other foot actuated control mechanisms than the one described in the text above and its related figures. The invention may be implemented in a "hanging" pedal arrangement, in a fully 'above the floor' pedal mechanism, or in any other number of foot actuated control mechanism arrangement.

While embodiments of the invention have been illustrated and described, it is not intended that these embodiments illustrate and describe all possible forms of the invention. Various changes, modifications, and alterations in the teachings of the present invention may be contemplated by those skilled in the art without departing from the intended spirit and scope thereof. It is intended that the present invention encompass such changes and modifications.

Having thus described the invention the details provided herein are intended for the ease of understanding only and are not to be construed in a limiting manner. The scope of the invention will become better understood from the appended claims.

What is claimed is:

1. A motion control system for a foot-actuated flight controller that controls a control surface of an aircraft, the system comprising:
    (a) an actuator coupled to a foot pedal of the controller for generating simulated feel forces on the foot pedal; and
    (b) control electronics in communication with the actuator for generating command signals to cause the actuator to
       i. generate at least two feel forces on the foot pedal at least in part in response to user inputs sensed on the foot pedal; and
       ii. control a trim function for the control surface of the aircraft.

2. The system of claim 1, wherein the control electronics generates command signals to cause the actuator to generate at least three feel forces on the foot pedal.

3. The system of claim 2, wherein one of the simulated feel forces generated by the actuator is a mechanical inertia force.

4. The system of claim 2, further including a set of position sensors for simultaneously sensing both pedal position and trim position of the foot-actuated flight controller.

5. The system of claim 2, further including one set of sensors for providing pedal position feedback to the actuator and one set of sensors for providing the foot-actuated flight controller position to an aircraft flight control system.

6. The system of claim 1, wherein the sensed user inputs include foot pedal position, torque, force, current, rotational speed, or any combination thereof.

7. The system of claim 1, wherein the control surface is the yaw axis and the actuator is coupled to mechanically-coupled first and second rudder pedal pairs.

8. The system of claim 1, wherein the control electronics is responsive to an automatically-generated input signal to further control the trim function of the foot pedal.

9. The system of claim 1, wherein the control electronics is responsive to a manual, user-generated input signal to control the trim function of the foot pedal.

10. The system of claim 1, wherein the actuator is electro-mechanical.

11. The system of claim 10, wherein the actuator comprises a motor.

12. The system of claim 10, wherein the actuator comprises a motor and gearhead assembly.

13. The system of claim 10, wherein the motor is a brushless DC motor.

14. The system of claim 1, wherein the control electronics is actuator control electronics (ACE).

15. The system of claim 1, wherein the control electronics is programmable.

16. The system of claim 1, further including a disconnect mechanism coupled between the actuator and the foot pedal.

17. The system of claim 16, wherein the disconnect mechanism is a shearing mechanism.

18. The system of claim 17, wherein the disconnect mechanism is a mechanical torque limiter.

19. The system of claim 16, wherein the disconnect mechanism is an electromechanical clutch.

20. A method for controlling a foot-actuated flight controller for a control surface of an aircraft, the method comprising:
    a. providing a single actuator coupled to a foot pedal of the flight controller; and
    b. controlling the actuator to generate feel forces and trim to the foot pedal, and (ii) trim to the control surface.

21. A method for trimming the feel system of a flight controller for a control surface of an aircraft, the method comprising:
    a. generating feel forces by way of a single actuator that is controlled with control electronics;
    b. controlling a trim function of the control surface by way of the single actuator;
    c. determining a zero point of force without the need to counteract forces of any federated feel force creating mechanisms; and
    d. setting the zero point of force in space.

* * * * *